United States Patent [19]

Hibi

[11] Patent Number: 5,372,555
[45] Date of Patent: Dec. 13, 1994

[54] CONTINUOUSLY VARIABLE TRACTION ROLLER TRANSMISSION

[75] Inventor: Toshifumi Hibi, Yokosuka, Japan

[73] Assignee: Nissan Motor Co., Ltd., Yokohama, Japan

[21] Appl. No.: 77,733

[22] Filed: Jun. 18, 1993

[30] Foreign Application Priority Data

Jul. 2, 1992 [JP] Japan ................ 4-199199

[51] Int. Cl.⁵ .............................. F16H 15/38
[52] U.S. Cl. ......................... 476/42; 475/216
[58] Field of Search .............. 476/40, 41, 42, 45, 476/46; 475/216

[56] References Cited

U.S. PATENT DOCUMENTS 5,027,669  7/1991  Nakano .............. 476/42 X
5,136,891  8/1992  Nakano .

FOREIGN PATENT DOCUMENTS 4-140865  7/1992  Germany .............. 476/42
1-193454  8/1989  Japan .................. 476/42
4-296549  1/1992  Japan .

Primary Examiner—Allan D. Herrmann
Attorney, Agent, or Firm—Foley & Lardner

[57] ABSTRACT

A continuously variable traction roller transmission comprises a driving gear which is of the helical gear type, and has an angle of torsion with the direction set to generate a force for biasing a second output disk to a second input disk at least in the forward run state of a motor vehicle and when torque is transmitted from an engine.

3 Claims, 3 Drawing Sheets

CONTINUOUSLY VARIABLE TRACTION ROLLER TRANSMISSION

BACKGROUND OF THE INVENTION

The present invention relates to a continuously variable traction roller transmission.

A previously proposed continuously variable traction roller transmission is disclosed, for example, in JP-A 4-29659. This continuously variable traction roller transmission includes a first traction roller transmission unit having a first input disk, a first output disk and a pair of first traction rollers which come in frictional contact with the two first disks, and a second traction roller transmission unit having a second input disk, a second output disk and a pair of second traction rollers which come in frictional contact with the two second disks. The first and second output disks are arranged to be adjacent to each other. The first input disk is supported to an input shaft on the outer periphery through a ball spline. The input shaft is coupled with a forward-/reverse change-over mechanism and a torque converter so as to input engine torque through the two. A biasing force generator is arranged to the first input disk on the rear side thereof. The second input disk is coupled with the input shaft through a ball spline. The second input disk undergoes a force toward the second output disk from a dish plate which in turn undergoes a compressive force from a loading nut engaged with the input shaft. The first and second output disks are rotatably supported on the input shaft through needle bearings, respectively. A driving gear is provided to rotate together with the first and second output disks. The driving gear engaged with a follower connected to one end of an intermediate shaft by a spline so as to rotate together, the intermediate shaft being disposed parallel with the input shaft.

According to such a known continuously variable traction roller transmission, however, there arises the following problem: The biasing force generator is arranged adjacent to the first traction roller transmission unit, which generates a force to be directly transmitted to the first input disk, and thus the first input and output disks produce a force for biasing the first traction rollers. On the other hand, in the second traction roller transmission unit, a force generated by the biasing force generator is transmitted to the second input disk through the input shaft. Since the input shaft is subjected to an axial frictional resistance out of a supporting bearing, etc., the second input and output disks have a relatively reduced force for biasing the second traction rollers as compared with the first input and output disks of the first traction roller transmission unit. Thus, the second traction roller transmission unit is more unstable than the first traction roller transmission unit, resulting in the impossibility of obtaining a predetermined torque capacity.

It is, therefore, an object of the present invention to provide a continuously variable traction roller transmission which has an increased transmission capacity of a second traction roller transmission unit, and an improved stability of the transmission capacity of the entirety of the transmission.

SUMMARY OF THE INVENTION

There is provided, according to the present invention, a continuously variable traction roller transmission for a motor vehicle having a crankshaft, the transmission including a first traction roller transmission unit having a first input disk, a first output disk and a pair of first traction rollers which come in frictional contact with the two first disks, and a second traction roller transmission unit having a second input disk, a second output disk and a pair of second traction rollers which come in frictional contact with the two second disks, the first output disk being adjacent to the second output disk, the first and second input disks being arranged on the same axis so as to face the first and second output disks, the transmission comprising:

a biasing force generator arranged to the first input disk on the side opposite to a contact surface thereof with respect to the pair of first traction rollers, said biasing force generator producing a first force in accordance with a torque as input;

a biasing force transmission shaft arranged to transmit to the second input disk said first force produced by said biasing force generator; and a driving gear arranged to rotate together with the first and second output disks, said driving gear having an angle of torsion with a direction see to generate a second force for biasing the second output disk to the second input disk at least in a forward run state of the motor vehicle and when said torque is transmitted from the crankshaft.

DETAILED DESCRIPTION OF THE INVENTION

Figure 1:
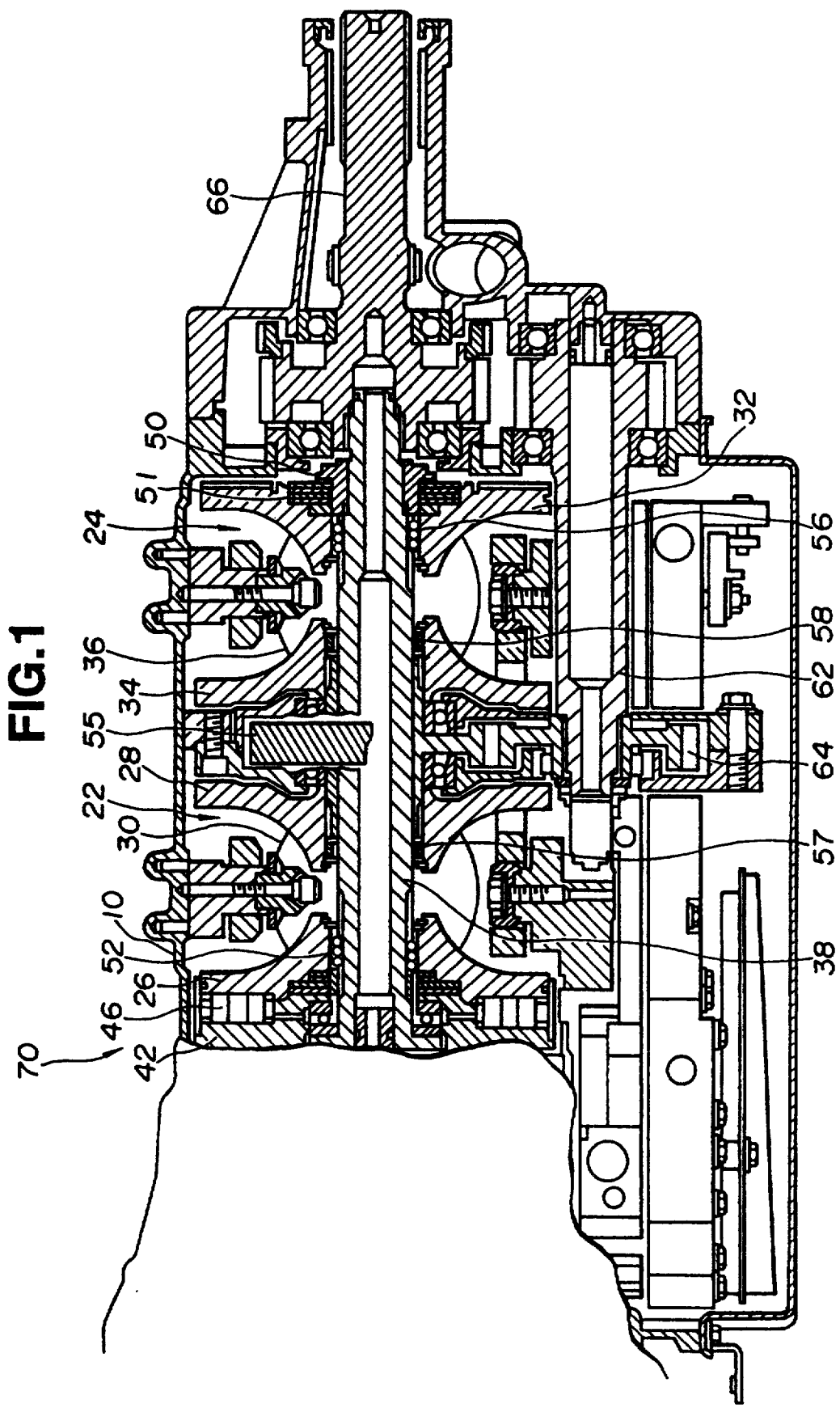
FIG. 1 is a sectional view of a first preferred embodiment of a continuously variable traction roller transmission according to the present invention.
Figure 2:
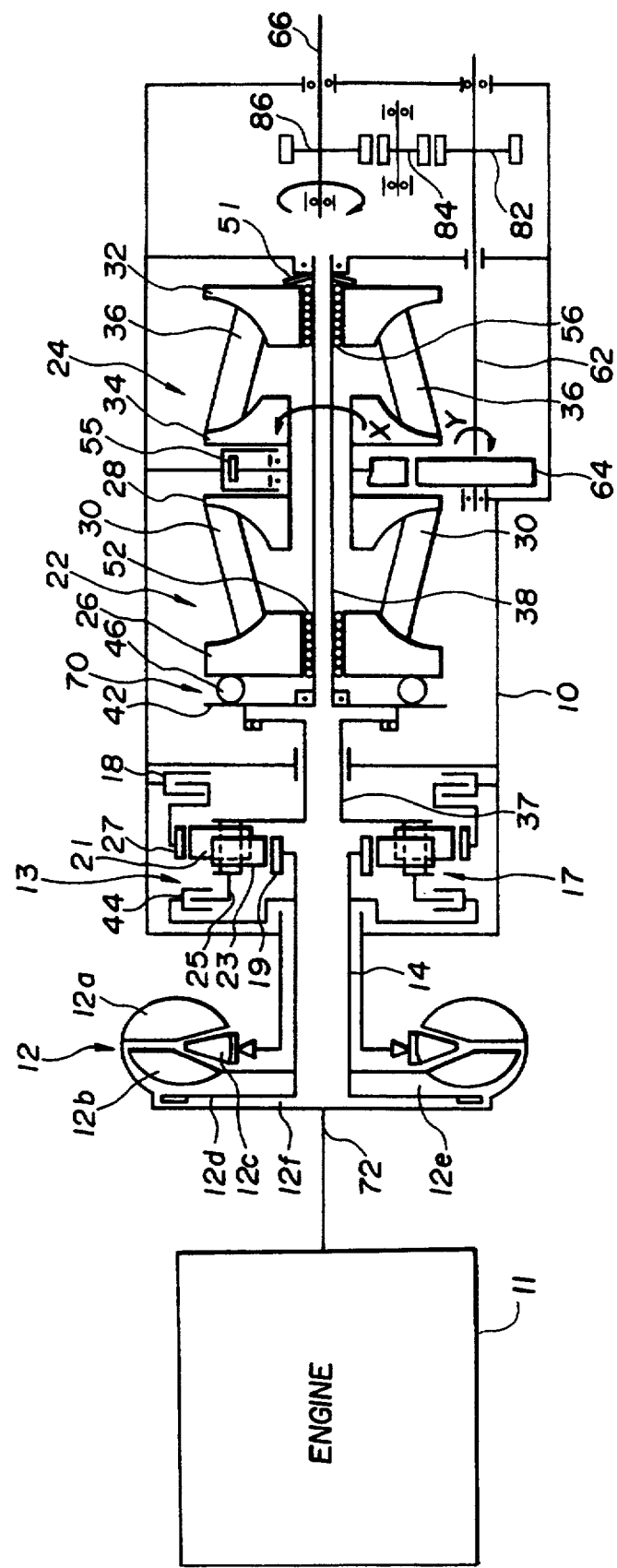
FIG. 2 is a skeleton drawing of the first preferred embodiment.

FIG. 1 shows a continuously variable traction roller transmission. First and second traction roller transmission units 22, 24 are disposed within a casing 10. The first traction roller transmission unit 22 includes a first input disk 26, a first output disk 28, and a pair of first traction rollers 30 for carrying out a transmission of torque between the two disks 26, 28. Contact surfaces of the first input disk 26 and the first output disk 28 with respect to the first traction rollers 30 are formed into a toroid. By changing the contact state of the first traction rollers 30 with respect to the first input disk 26 and the first output disk 28, the speed ratio of the first input disk 26 to the first output disk 28 can continuously be varied. Likewise, the second traction roller transmission unit 24 includes a second input disk 32, a second output disk 34, and a pair of second traction rollers 36. It is to be noted that the second input disk 32 and the second output disk 34 are arranged in an opposite way to the first input disk 26 and the first output disk 28 of the first traction roller transmission unit 22. That is, the first output disk 28 and the second output disk 34 are disposed to be adjacent to each other. The first input disk 26 is supported to an input shaft or biasing force transmission shaft 38 on the outer periphery thereof through a ball spline 52. Referring also to FIG. 2, the input shaft 38 is coupled with a forward/reverse change-over mechanism 13 and a torque converter 12 so as to input engine torque through the two. A biasing force generator 70 is arranged to the first input disk 26 on the rear side thereof. The biasing force generator 70 includes a cam flange 42, a rear portion of the first input disk 26, and a cam roller 46. The cam roller 46 is interposed between facing cam surfaces of the cam flange 42 and the first input disk 26. The cam roller 46 has such a shape as to produce a force for biasing the first input disk 26 to the first output disk 28 when the first input disk 26 and the cam flange 42 make relative rotation. The second input disk 32 of the second traction transmission unit 24 is coupled with the input shaft 38 through a ball spline 56. The second input disk 32 undergoes a force toward the second output disk 34 from a dish plate 51 which in turn undergoes a compressive force from a loading nut 50 engaged with the input shaft 38. The first output disk 28 of the first traction roller transmission unit 22 and the second output disk 34 of the second traction roller transmission unit 24 are rotatably supported on the input shaft 38 through needle bearings 57, 58, respectively. A driving gear 55 is provided to rotate together with the first and second output disks 28, 34. The driving gear 55 is of the helical gear type. The driving gear 55 has an angle of torsion with the direction set to generate a force for biasing the second output disk 34 to the input disk 32 when a motor vehicle is in the forward run state with a forward clutch 44 (which will be described later in connection with FIG. 2) of the forward/reverse change-over mechanism 13 engaged and when torque is transmitted from the engine to the input shaft 38. The driving gear 55 is engaged with a follower 64 connected to one end of an intermediate shaft 62 so as to rotate together, the intermediate shaft being disposed parallel with the input shaft 38. Rotation of the intermediate shaft 62 is transmitted to an output shaft 66 through gears 82, 84 and 86, as shown in FIG. 2.

FIG. 2 shows a structure of the continuously variable traction roller transmission of FIG. 1 diagrammatically. The torque converter 12 which inputs torque from a crankshaft 72 of an engine 11 includes a pump impeller 12a, a turbine runner 12b, a stator 12c, and a lockup clutch 12d. The lockup clutch 12d can accomplish mechanical coupling/separation off the pump impeller 12a with/from the turbine runner 12b in accordance with hydraulic pressure within an apply side hydraulic chamber 12e and a release side hydraulic chamber 12f. Connected to the forward/reverse change-over mechanism 13 is a turbine shaft 14 which rotates together with the turbine runner 12b of the torque converter 12. The forward/reverse change-over mechanism 13 includes a planetary gear mechanism 17, the forward clutch 44, and a reverse brake 18. The planetary gear mechanism 17 comprises a sun gear 19, a pinion carrier 25 having two pinion gears 21, 23, and an internal gear 27. The pinion gears 21, 23 with the same diameter are engaged with each other, and the pinion gear 21 is engaged with the internal gear 27 whereas the pinion gear 23 is engaged with the sun gear 19. The sun gear 19 is always coupled with the turbine shaft 14 to rotate together. The pinion carrier 25 can be connected to the turbine shaft 14 by the forward clutch 44, whereas the internal gear 27 can be fixed to the casing 10 by the reverse brake 18. The pinion carrier 25 is always coupled with a transmission shaft 37 to the traction roller transmission units. The first and second traction roller transmission units 22, 24 are located downstream of the forward-/reverse change-over mechanism 13 within the casing 10, and are disposed, as described above, parallel with the input shaft 38 coupled with the transmission shaft 37 to rotate together.

Next, the operation of the first preferred embodiment will be described. When rotation of the torque converter 12 is input to the input shaft 38 with the forward clutch 44 being in engagement, the first input disk 26 is rotated, and at the same time, the cam roller 46 generates a biasing force corresponding to input torque of the input shaft 38. Thus, the first traction rollers 30 are held by the first input disk 26 and the first output disk 28 to rotate without any slippage, carrying out power transmission from the first input disk 26 to the first output disk 28. Further, since the input shaft 38 is urged to move leftward as viewed in FIG. 1 by operation of the biasing force generator 70, the second input disk 32 is drawn leftward as viewed in FIG. 1. Furthermore, since upon torque transmission, the driving gear 55 rotates in the direction of an arrow X in FIG. 2 whereas the follower 64 rotates in the direction of an arrow Y in FIG. 2, these helical gears produce an axial force for biasing the second output disk 34 to the second input disk 32. This provides to the second input disk 32 and the second output disk 34 a force for holding the second traction rollers 36 of the second traction roller transmission unit 24. Thus, the second traction rollers 36 are held by the two disks 32, 34 to rotate without any slippage, carrying out power transmission from the second input disk 32 to the second output disk 34. At this time, the second output disk 34 undergoes an axial force from the driving gear 55, so that the second traction roller transmission unit 24 has an increased transmission capacity. It is to be noted that in this embodiment, when the reverse brake 18 is in engagement, the driving gear 55 and the follower 64 rotate in the direction opposite to the above direction. As a result, these helical gears produce an axial force for separating the second output disk 34 from the second input disk 32. However, this fails to result in an impossibility of normal reverse run. Furthermore, reverse run occurs with very low frequency as compared with forward run, and continuous reverse run occurs scarcely in the hard condition which produces high oil temperature, etc., thereby causing no particular problem.

Figure 3:
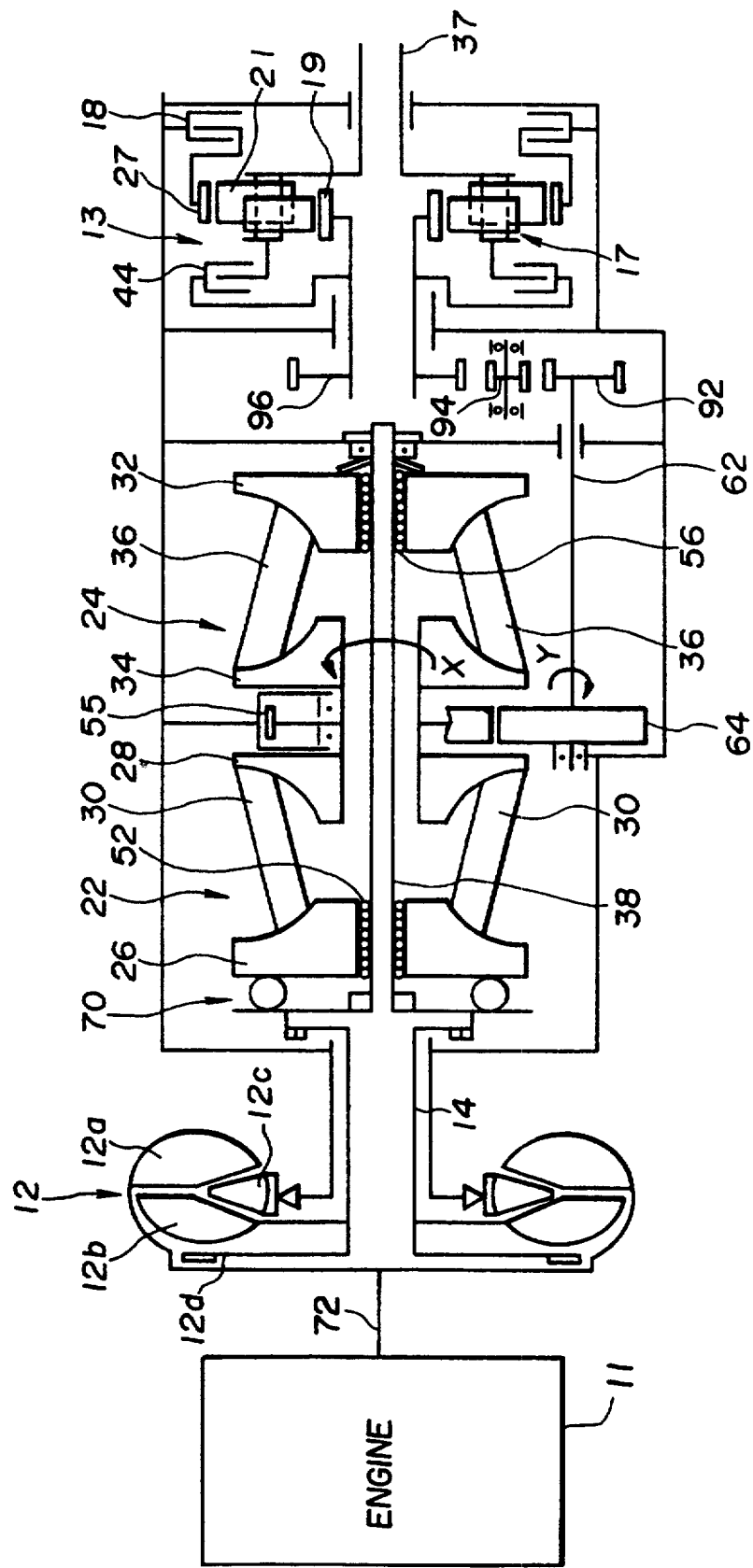
FIG. 3 is a view similar to FIG. 2, showing a second preferred embodiment of the present invention.

FIG. 3 shows a second preferred embodiment of the present invention. The structure of this embodiment is substantially the same as that of the first preferred embodiment except the forward/reverse change-over mechanism 13 of the first preferred embodiment is disposed downstream of the second traction roller transmission unit 24 in terms of torque transmission route. Also, the operation of this embodiment is substantially the same as that of the first preferred embodiment except the driving gear 55 and the follower 64 rotate always in the direction of an arrow X and an arrow Y in FIG. 3 regardless of forward run and reverse run. As a result, when torque is transmitted from the engine, the helical gears always produce a force for biasing the second output disk 34 to the second input disk 32. Rotation of the intermediate shaft 62 is transmitted to the transmission shaft 37 through gears 92, 94 and 96, as shown in FIG. 3.

Having described the present invention in connection with the preferred embodiments, it is to be noted that the present invention is not limited thereto, and various changes and modifications are possible without departing from the spirit of the present invention.

What is claimed is:

1. A continuously variable traction roller transmission for a motor vehicle having forward and reverse running conditions and having a crank shaft for providing a torque, comprising:

a first traction roller transmission unit having a first input disk, a first output disk and a pair of first traction rollers which come in frictional contact with said first input and output disks;

a second traction roller transmission unit having a second input disk, a second output disk and a pair of second traction rollers which come in frictional contact with said second input and output disks;

said first output disk being adjacent to said second output disk, said first and second input disks being arranged on the same axis so as to face said first and second output disks;

a biasing force generator arranged to said first input disk on the side opposite to a contact surface thereof with respect to said pair of first traction rollers, said biasing force generator producing a first force in accordance with the torque of the crankshaft;

a biasing force transmission shaft arranged to transmit to said second input disk said first force produced by said biasing force generator; and a driving gear arranged to rotate together with said first and second output disks, said driving gear having an angle of torsion with a direction set to generate a second force for biasing said second output disk to said second input disk at least in the forward running condition of the motor vehicle and when receiving the torque of the crankshaft, said driving gear being of the helical gear type.

2. A continuously variable traction roller transmission of a motor vehicle having forward and reverse run states and having an engine for providing a torque, comprising:

a first traction roller transmission unit having a first input disk, a first output disk and a set of first traction rollers which come in frictional contact with said first input and output disks;

a second traction roller transmission unit having a second input disk, a second output disk and a sen of second traction rollers which come in frictional contact with said second input and output disks;

said first output disk being adjacent to said second output disk, said first and second input disks being arranged on the same axis so as to face said first and second output disks;

a biasing force generator arranged to said first input disk on the side opposite to a contact surface thereof with respect to said set of first traction rollers, said biasing force generator producing a first force in accordance with the torque of the engine;

a biasing force transmission shaft arranged to transmit to said second input disk said first force produced by said biasing force generator; and a driving gear arranged to rotate together with said first and second output disks, said driving gear having an angle of torsion with a direction set to generate a second force for biasing said second output disk to said second input disk at least in the forward run state of the motor vehicle and when receiving the torque of the engine, said driving gear being of the helical gear type.

3. In a motor vehicle having forward and reverse run states:

an engine arranged to provide a torque; and a continuously variable traction roller transmission connected to said engine, said continuously variable traction roller transmission including:

a first traction roller transmission unit having a first input disk, a first output disk and a set of first traction rollers which come in frictional contact with said first input and output disks;

a second traction roller transmission unit having a second input disk, a second output disk and a set of second traction rollers which come in frictional contact with said second input and output disks;

said first output disk being adjacent to said second output disk, said first and second input disks being arranged on the same axis so as to face said first and second output disks;

a biasing force generator arranged to said first input disk on the side opposite to a contact surface thereof with respect to said set of first traction rollers, said biasing force generator producing a first force in accordance with said torque of said engine;

a biasing force transmission shaft arranged to transmit to said second input disk said first force produced by said biasing force generator; and a driving gear arranged to rotate together with said first and second output disks, said driving gear having an angle of torsion with a direction set to generate a second force for biasing said second output disk to said second input disk at least in the forward run state of the motor vehicle and when receiving said torque of said engine, said driving gear being of the helical gear type.

* * * * *